United States Patent
Park

(10) Patent No.: US 7,510,469 B2
(45) Date of Patent: Mar. 31, 2009

(54) HINGE STRUCTURE OF AN AIR VENT GRILL

(75) Inventor: In-Heum Park, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 58 days.

(21) Appl. No.: 11/198,226

(22) Filed: Aug. 8, 2005

(65) Prior Publication Data

US 2006/0040606 A1 Feb. 23, 2006

(30) Foreign Application Priority Data

Aug. 17, 2004 (KR) ............. 10-2004-0064741

(51) Int. Cl.
 *B60H 1/32* (2006.01)
(52) U.S. Cl. .................................. 454/155
(58) Field of Classification Search ......... 454/202–204, 454/155; 62/262
 See application file for complete search history.

(56) References Cited

U.S. PATENT DOCUMENTS 6,447,388 B1 * 9/2002 de Barros et al. ........... 454/202
6,739,969 B2 5/2004 Shin
6,881,139 B2 4/2005 Yang

FOREIGN PATENT DOCUMENTS

JP 2002-286284 10/2002

OTHER PUBLICATIONS

Comp. English translation of detailed description of JP 2002-286284.*
English Language Abstract of JP 2002-286284.

* cited by examiner

*Primary Examiner*—Steve McAllister
*Assistant Examiner*—Helena Kosanovic
(74) *Attorney, Agent, or Firm*—Greenblum & Bernstein, P.L.C.

(57) ABSTRACT

A hinge structure of an air vent grill includes an air vent grill, installed in an instrument panel, that adjusts the discharge direction of an air stream, a hinge shaft connected to a knob that manipulate the air vent grill and protruded from a side surface of a case of the air vent grill, a case member provided at the side of the instrument panel and formed with a hollow portion that places the hinge shaft therein, and an elastic clip installed in the case member, configured such that it surrounds the hinge shaft disposed in the hollow portion of the case member, and made of an elastic bent piece so as to elastically press the hinge shaft.

5 Claims, 5 Drawing Sheets

HINGE STRUCTURE OF AN AIR VENT GRILL

RELATED APPLICATIONS

The present disclosure relates to subject matter contained in Korean Application No. 12004-0064741, filed on Aug. 17, 2004, which is herein expressly incorporated by reference its entirety.

BACKGROUND OF THE INVENTION

1. Field of the Invention

The present invention relates to a hinge structure of an air vent grill, and more particularly to a hinge structure of an air vent grill securing reliability even when being repeatedly operated, and enhancing the tactile feedback provided when manipulating a knob using the elastic pressure of an elastic clip applied to a hinge shaft.

2. Description of the Related Art

Generally, in order to cool and warm the vehicle compartment, an air conditioning system for generating and supplying warm or chilled air into the vehicle compartment is installed in the vehicle.

The air conditioning system includes a blower unit for blowing air, a heater unit for heating the blown air (or an evaporating unit for cooling the blown air), a duct communicated with the heater unit and guiding the heated or chilled air into the vehicle compartment, and an air vent grill installed at the end of the duct for adjusting the discharge direction of the air.

Hereinafter, the conventional air vent grill will be described in detail with reference to the accompanying drawings.

As shown in FIG. 1, the air vent grill 1 generally includes horizontal blades 5 installed to a case 3 having front and rear open sides, and vertical blades crossing the horizontal blades 5 in a lattice shape, so that a user adjusts the blowing direction by moving a knob 7 provided at the front side of the air vent grill 1.

The knob 7 is connected to a hinge shaft 9 as one of the shafts of the horizontal blades 5, and the hinge shaft 9 protrudes to the side of the case 3.

In order to provide the gripping patterns enhancing the tactile feedback provided when manipulating the knob 7, a washer 11 is fitted around the end of the hinge shaft 9.

The washer 11 is inserted into an installing recess formed in an inner wall of the instrument panel which is installed to the air vent grill 1 and prevented from rotating, and the discharge direction of the air stream from the air vent grill 1 can be adjusted due to the contact friction between the washer 11 and the hinge shaft 9.

However, in the hinge structure of the conventional air vent grill, since the hinge shaft 9 and the washer 11 are made of plastic, it is difficult to maintain their dimensions, and since the ambient temperature varies depending on the season, the dimensions of the hinge shaft 9 and the washer 11 are changed.

If the association of the hinge shaft 9 and the washer 11 is released because of the above problems, the hinge shaft 9 of the air vent grill 1 cannot be fixed, and thus the discharge direction of the air stream cannot be also adjusted.

Moreover, if the hinge shaft 9 and the washer 11 are coupled to each other by excessive force, the tactile feedback of the hinge shaft 9 is bad, and components of the conventional air vent grill 1 may be damaged if the user accidentally applies excessive force to the hinge shaft 9.

Although the hinge shaft 9 is installed normally when manufacturing, the plastic hinge shaft 9 and washer 11 are worn down after extended periods of use, so that the tactile feedback cannot be maintained.

SUMMARY OF THE INVENTION

Therefore, the present invention has been made in view of the above and/or other problems, and it is an object of the present invention to provide a hinge structure of an air vent grill overcoming the problem that, since a hinge shaft and a washer are coupled by fitting, the coupling of the hinge shaft and the washer loosens due to temperature changes and erosion of the components after extended periods of use so that malfunction occurs in adjusting the discharge direction of the air stream from the air vent grill.

In accordance with the present invention, the above and other aspects can be accomplished by the provision of a hinge structure of an air vent grill including an air vent grill, installed in an instrument panel, for adjusting the discharge direction of an air stun, a hinge shaft connected to a knob, for manipulating the air vent grill, and protruded from a side surface of a case of the air vent grill, a case member provided at the side of the instrument panel and formed with a hollow portion for placing the hinge shaft therein, and an elastic clip installed in the case member, configured such that it surrounds the hinge shaft dipped in the hollow portion of the case member, and made of an elastic bent piece so as to elastically press the hinge shaft.

Preferably, the case member includes an installing recess formed at the side of the hollow portion so as to lock and install the elastic clip, and an installing hole penetrating the other side of the hollow portion corresponding to the installing recess so as to receive the elastic clip.

Moreover, the elastic clip includes a fixing portion made by bending the sides of the elastic clip and inserted into the installing recess, a pressing portion connected to the fixing portion, configured such that it surrounds the circumference of the hinge shaft, and having a diameter smaller than the diameter of the hinge shaft so as to press the hinge shaft, a bent portion bent outward so as to apply an elastic force to the pressing portion, and a locking portion connected to the bent portion and having an open side to be elastically locked between the installing hole and the hollow portion.

It is preferred that the elastic clip is made of metal.

The elastic clip further includes a hanging portion extended from the locking portion and bent to be locked by and fixed to the outer sides of the case member adjacent to the installing hole.

The hinge structure of an air vent grill further includes an elastic member installed in the fixing recess such that one end contacts the side surface of the pressing portion of the elastic clip surrounding the hinge shaft and the other end are fixed in the fixing recess formed on the inner surface of the case member.

According to the present invention, since contact force is provided to the hinge shaft by the elastic pressure of the elastic clip, durability and performance of the air vent grill are enhanced.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, the hinge structure of an air vent grill according to the preferred embodiment of the present invention will be described in detail with reference to the accompanying drawings.

Figure 1:
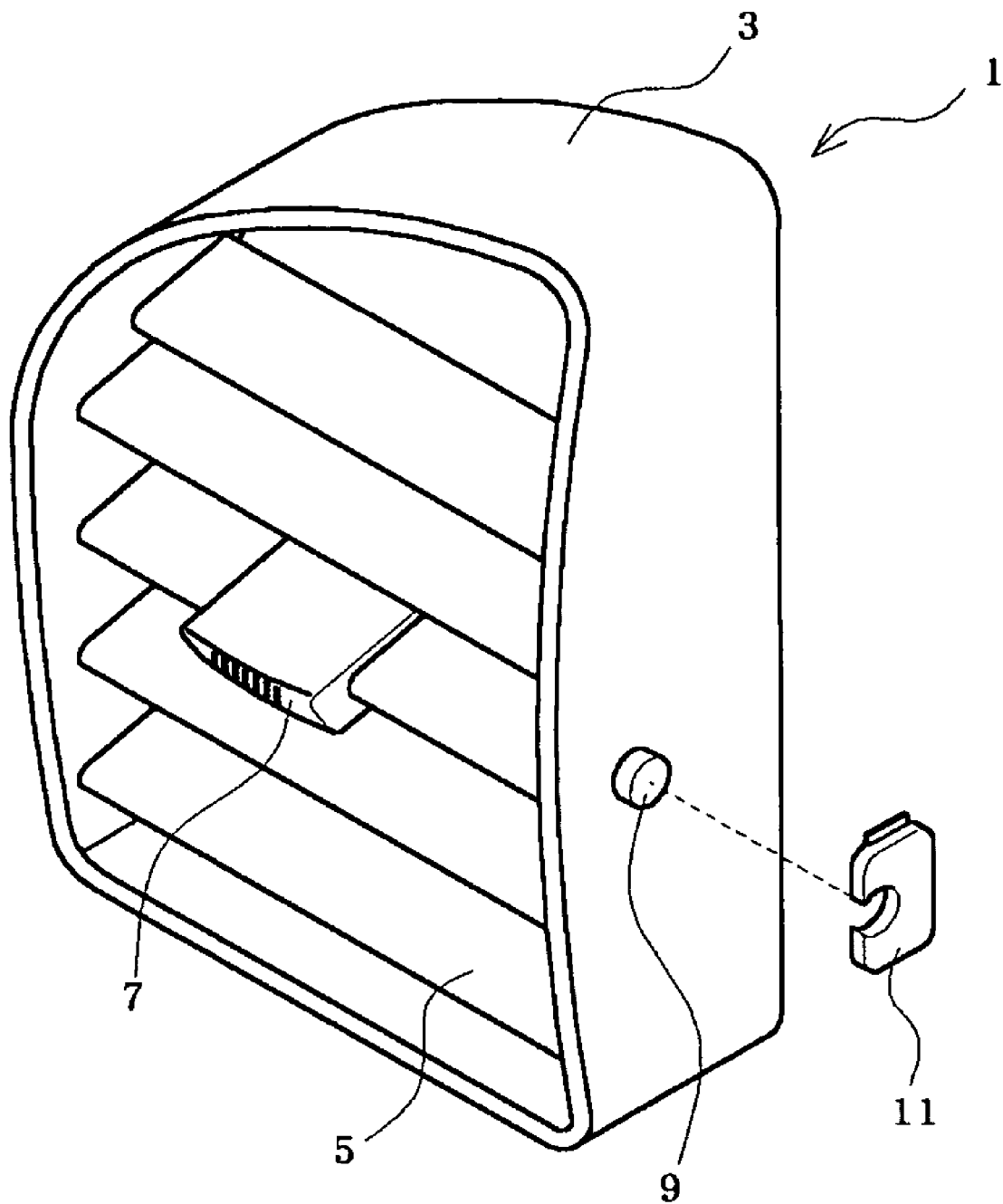
FIG. 1 is a perspective view illustrating a hinge of a conventional air vent grill.
Figure 2:
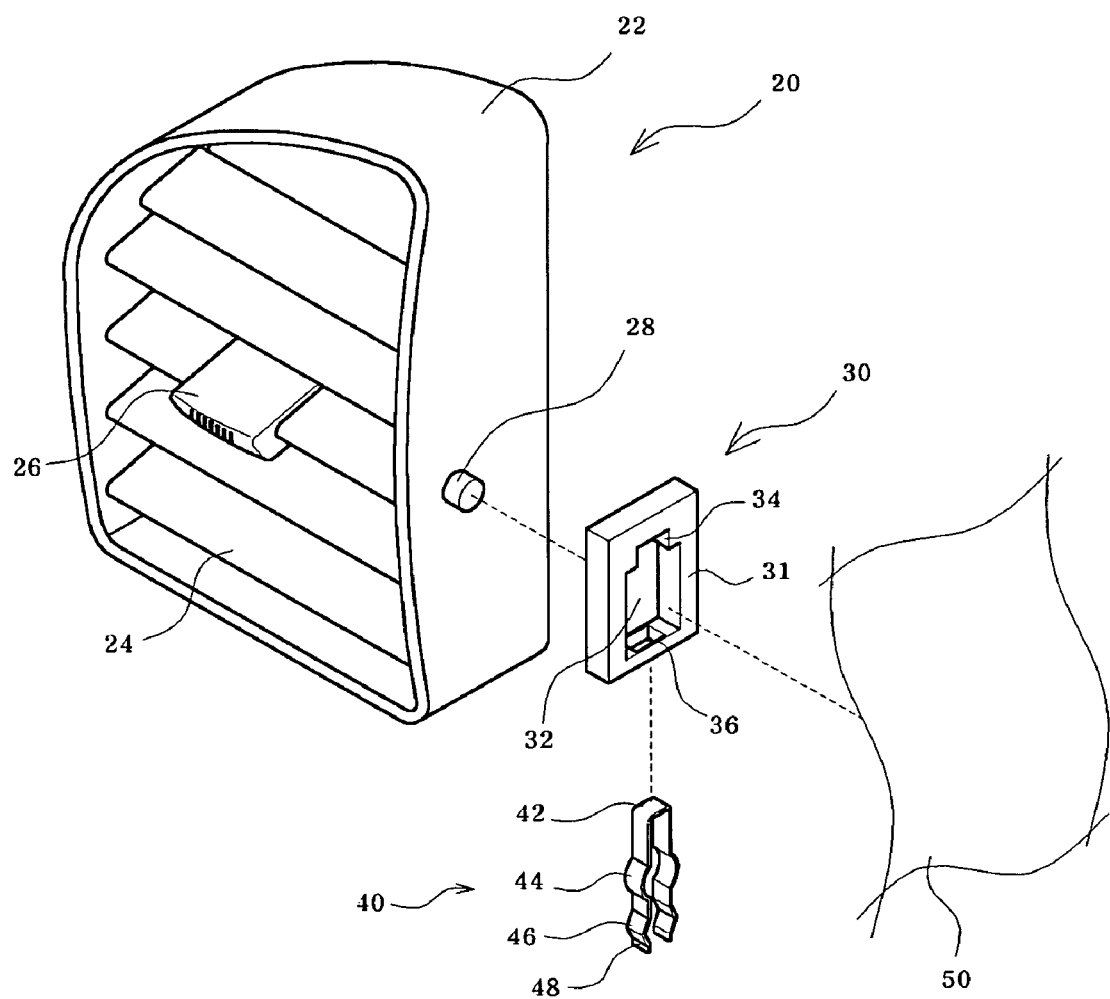
FIG. 2 is an exploded perspective view illustrating a hinge structure of an air vent grill according to the preferred embodiment of the present invention.
Figure 3:
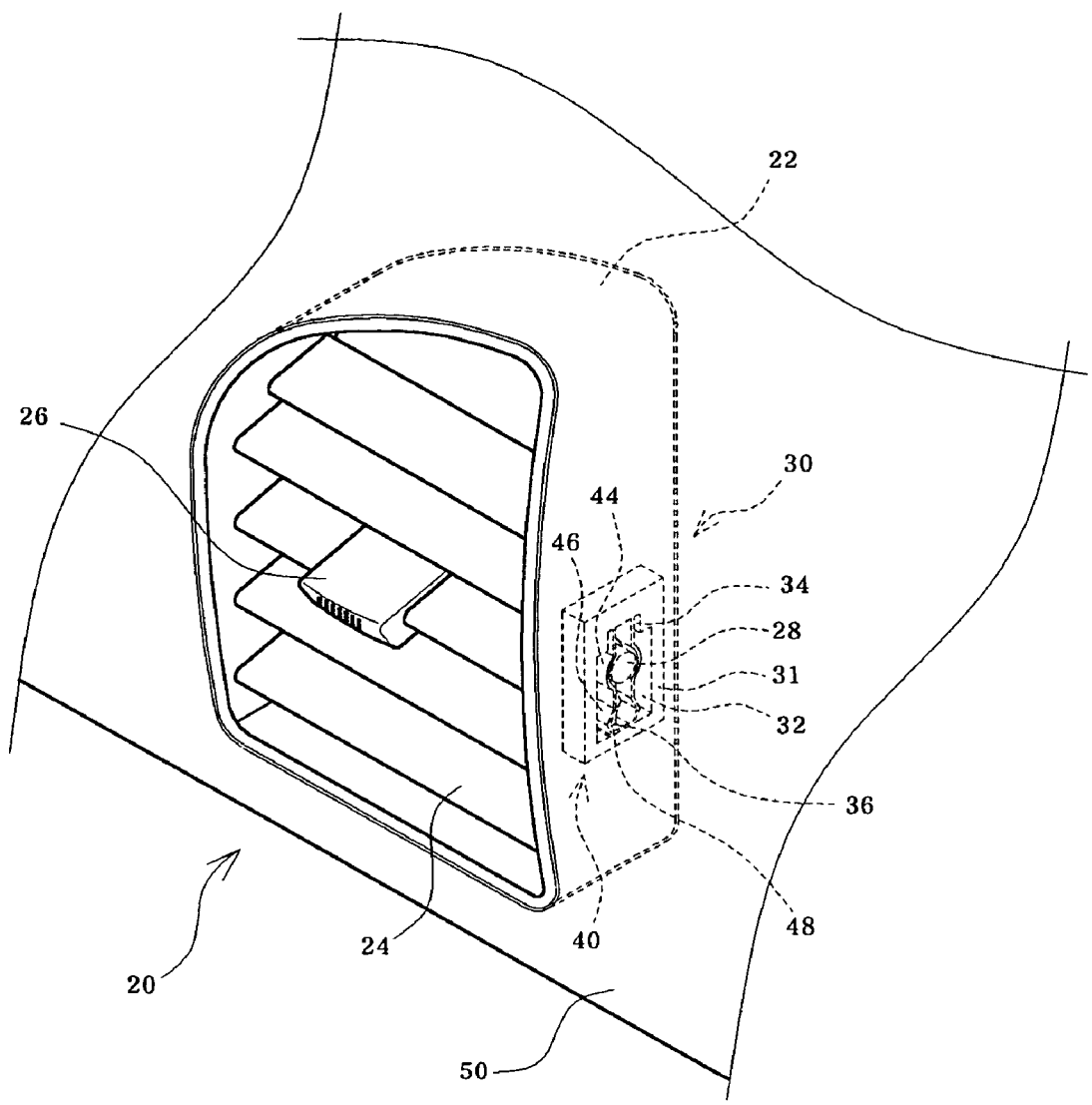
FIG. 3 is a view illustrating the assembly of the hinge structure in FIG. 2.
Figure 4:
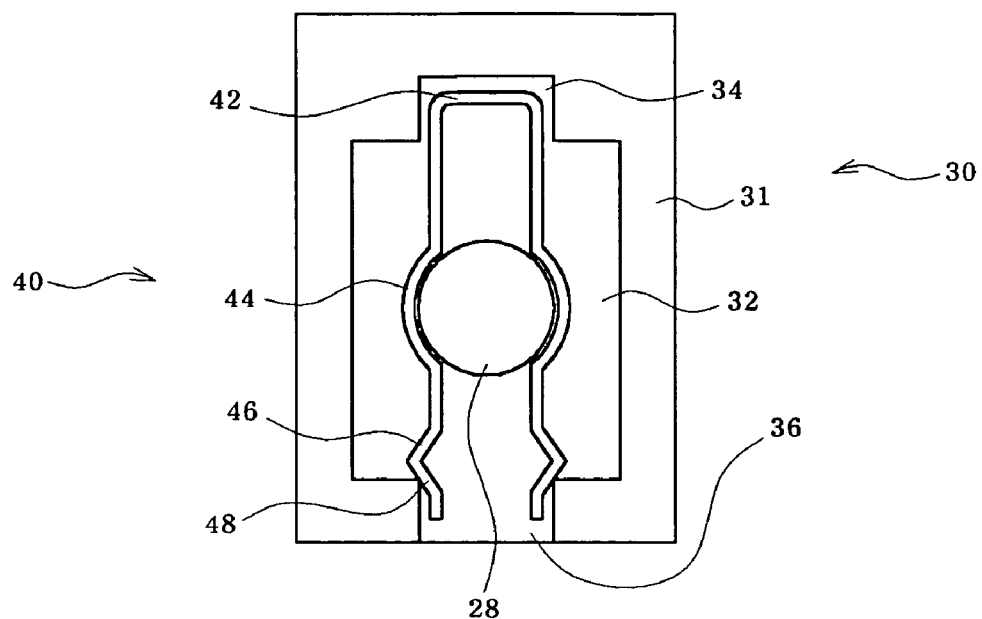
FIG. 4 is a side sectional view illustrating the installation of the hinge shaft shown in FIG. 2 to an elastic clip coupled to a case member.
Figure 5:
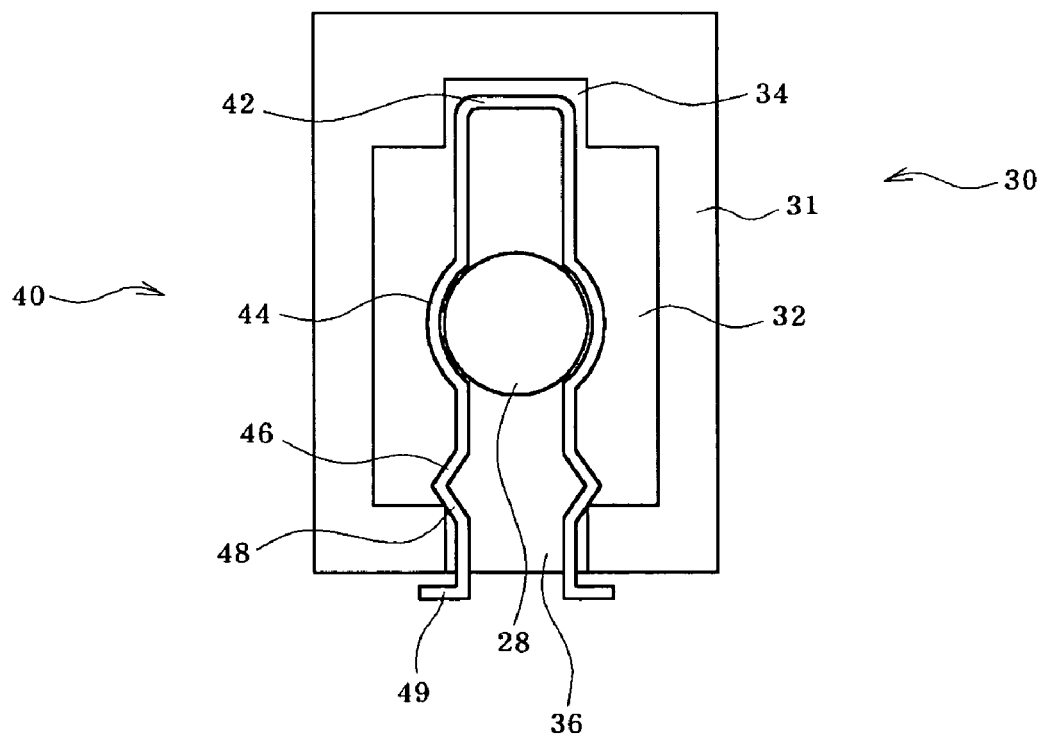
FIG. 5 is a view illustrating a hinge structure of an air vent grill according to another embodiment of the present invention.
Figure 6:
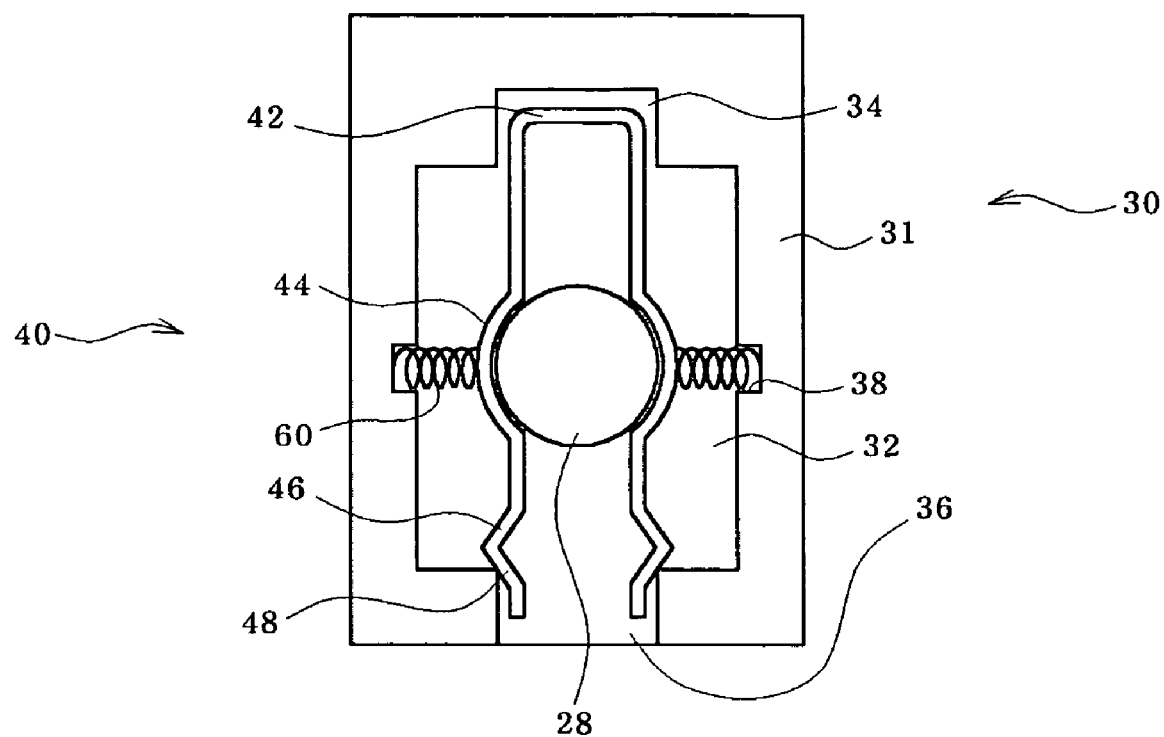
FIG. 6 is a view illustrating a hinge structure of an air vent grill according to still another embodiment of the present invention.

FIG. 2 is an exploded perspective view illustrating a hinge structure of an air vent grill according to the preferred embodiment of the present invention, FIG. 3 is a view illustrating the assembly of the hinge structure in FIG. 2, FIG. 4 is a side sectional view illustrating the installation of a hinge shaft shown in FIG. 2 to an elastic clip coupled to a case member, FIG. 5 is a view illustrating a hinge structure of an air vent grill according to another embodiment of the present invention, and FIG. 6 is a view illustrating a hinge struggle of an air vent grill according to still another embodiment of the present invention.

An air vent grill 20 communicated with an air duct is provided with a case 22 having open front and tear ends at the outer side thereof, and a plurality of horizontal blades 24 and a vertical blade provided at the inside of the case 22.

A knob 26 for adjusting directions of the horizontal blades 24 and the vertical blade is installed at the side of the horizontal blades 24.

The horizontal blades 24 having the knob 26 are provided with a hinge shaft 28 protruded to the side of the case 22.

A body 31 of a case member 30 is formed with a penetrating hollow portion 32 so as to place the hinge shaft 28 inside the body 31.

The hollow portion 32 has an installing recess 34 formed at the inner side thereof, and an installing hole 36 communicating with the exterior and formed at the other inner side of the hollow portion 32 by cutting the body 31.

An elastic clip 40 inserted into the case member 30 is installed in the case member 30, is configured such that it surrounds the hinge shaft 28 positioned in the hollow portion 32 of the case member 30, and is made of an elastic metal piece by bending the metal piece so as to apply an elastic force to the hinge shaft 28.

The elastic clip 40 has a fixing portion 42 formed by bending the sides of the elastic clip 40 and fixed in the installing recess 34, and pressing portions 44 connected to the fixing portion 42 and is configured such that it surrounds the outer circumference of the hinge shaft 28 and a diameter less than the diameter of the hinge shaft 28 so as to apply pressure to the circumference of the hinge shaft 28.

In order to provide the elastic force to the pressing portions 44, the elastic clip 40 has bent portions 46 bent outward, and locking portions 48 connected to the bent portions 46 and having an open side to be disposed between the installing hole 36 and the hollow portion 32.

The case member 30 is fixedly installed at the side of an instrument panel 50 in which the air vent grill 20 is installed The case member 30 may be installed in any suitable manners, such as by molding or adhesive attachment.

According to another preferred embodiment of the present invention, as shown in FIG. 5, the elastic clip 40 further includes hanging portions 49 which are extended from the locking portions 48 respectively, penetrate the installing hole 36, and have bent ends to be locked by and fixed to the outer sides of the case member 30 adjacent to the installing hole 36.

According to still another preferred embodiment of the present invention, as shown in FIG. 6, the case member 30 further has fixing recesses 38 formed at the inner surfaces thereof adjacent to the hollow portion 32 in a predetermined depth.

Spring-made elastic members 60 are installed in the fixing recesses 38, one end of each contacting the side surface of the pressing portions 44 of the elastic clip 40 surrounding the hinge shaft 28 and their other ends are fixed in the fixing recesses 38 formed inner surfaces of the case member 30.

Operation of the hinge structure of the air vent grill according to the preferred embodiments of the present invention will be described.

The elastic clip 40 is inserted into the installing hole 36 of the case member 30 installed at the side of the instrument panel 50, so that the fixing portion 42 of the elastic clip 40 is disposed in the installing recess 34 of the case member 30 and the locking portions 49 are locked by the installing hole 36.

In this state, the hinge shaft 28 of the air vent grill 20 is inserted into the pressing portions 44 of the elastic clip 40.

As such, the pressing portions 44 having a diameter less than the diameter of the hinge shaft 28 are spread outward while applying the elastic force to the circumference of the hinge shaft 28.

The locking portions 48 are locked by and fixed in the installing hole 35 due to the bent portions 46 of the clip 40, so that the bent portions 46 provide an elastic restoring force to the locking portions 48.

When manipulating the knob 26 to rotate a rotation shaft, contact friction is generated between the circumference of the hinge shaft 28 and the pressing portions 44 of the elastic clip 40 by the pressing portions 44.

As such, a user have a good tactile feeling when manipulating the knob 26, and the knob 26 is not separated from a preset manipulated position unless applying an excessive force to the knob 26.

As shown in FIG. 5, the hanging portions 49 are bent outward and protruded to the outside of the case member 30, and when the elastic clip 40 becomes old and must be replaced, the user the locking portions 48 and easily removes the elastic clip 40 from the case member 30, so that the replacement of the elastic clip 40 can easily be performed.

As shown in FIG. 6, the elastic force of the elastic clip 40, providing a predetermined frictional force during the rotation of the hinge shaft 28, may be deteriorated with age, the elastic members 60 elastically press the side surfaces of the pressing portions 44 so as to continuously apply a predetermined frictional force to the hinge shaft 28 during the rotation of the hinge shaft 28.

According to the present invention, since the elastic clip provides static friction to the rotation of the hinge shaft 28 using the elasticity, the dimensions of the components can be easily maintained in comparison to the case of applying the static friction by fitting the conventional extruded plastic components.

Since the elastic clip 40 contacting the hinge shaft 28 is made of metal, wear of the elastic clip 40 is minimized and the influence of heat expansion or shrinkage due to the ambient temperature, is minimized in comparison to the conventional plastic protruding components. Thus, optional reliability is secured.

As described above, according to the hinge structure of the air vent grill in accordance with the present invention, since the elastic clip for elastically pressing the hinge shaft and the case member for supporting the elastic clip are used, malfunction due to ambient temperature is overcome, and since the structure for providing sic friction to the hinge shaft using the elastic pressure is utilized, the dimensions of the components are easily maintained and the rejection rate of the air vent grill can be Although the preferred embodiments of the present invention have been disclosed for illustrative purposes, those skilled in the art will appreciate that various modifications, additions and substations are possible, without departing from the scope and spirit of the invention as disclosed in the accompanying claims.

What is claimed is:

1. A hinge structure of an air vent grill comprising:
   an air vent grill provided in an instrument panel, the air vent grill configured to adjust discharge direction of an air stream;
   a hinge shaft connected to a knob that manipulates the air vent grill, the hinge shaft is fixed to and protrudes outwardly from a side surface of a case of the air vent grill;
   a case member fixedly installed at a side of the instrument panel and formed with a hollow portion that receives the outwardly protruding hinge shaft therein; and
   an elastic clip installed in the hollow portion of the case member, the elastic clip configured to surround the hinge shaft, the elastic clip formed of an elastic bent piece so as to elastically press circumferential portions of the hinge shaft, the elastic clip including a fixing portion provided thereon and formed by bending sides of the elastic clip, and locking portions provided thereon at an opposite side to the fixing portion,
   wherein the case member comprises:
   an installing recess formed at one side of the hollow portion, the installing recess configured to receive the fixing portion of the clip;
   an installing hole penetrating a side of the hollow portion opposite the one side, the installing hole configured to receive the elastic clip inserted therethrough for installation and to receive the locking portion of the elastic clip after installation; and
   the hollow portion provided between the installing recess and the installing hole.

2. The hinge structure of an air vent grill as set forth in claim 1, wherein the elastic clip comprises:
   a pressing portion connected to the fixing portion, the pressing portion configured to engage the circumferential portions of the hinge shaft, and having a diameter smaller than an outer diameter of the hinge shaft so as to press against the hinge shaft;
   an outwardly bent portion configured to apply an elastic force to the pressing portion; and
   the locking portion connected to the bent portion and having an open side to be elastically locked between the installing hole and the hollow portion.

3. The hinge structure of an air vent grill as set forth in claim 1, wherein the elastic clip is made of metal.

4. The hinge structure of an air vent grill as set forth in claim 2, wherein the elastic clip further comprises a hanging portion extended from the locking portion and bent to be locked by and fixed to outer sides of the case member adjacent to the installing hole.

5. The hinge structure of an air vent grill as set forth in claim 1, further comprising an elastic member installed in a fixing recess formed on an inner surface of the hollow portion such that one end thereof contacts a side surface of the pressing portion of the elastic clip surrounding the hinge shaft and an opposite end thereof is fixed in the fixing recess.

* * * * *